United States Patent
Su et al.

(10) Patent No.: US 12,443,644 B2
(45) Date of Patent: Oct. 14, 2025

(54) DATA STRUCTURE FOR MULTIMEDIA APPLICATONS

(71) Applicant: Dolby Laboratories Licensing Corporation, San Francisco, CA (US)

(72) Inventors: Guan-Ming Su, Fremont, CA (US); Tao Chen, Palo Alto, CA (US); Sheng Qu, San Jose, CA (US); Samir N. Hulyalkar, Los Gatoes, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/729,174

(22) PCT Filed: Dec. 19, 2022

(86) PCT No.: PCT/US2022/053418
§ 371 (c)(1),
(2) Date: Jul. 16, 2024

(87) PCT Pub. No.: WO2023/140952
PCT Pub. Date: Jul. 27, 2023

(65) Prior Publication Data
US 2025/0005068 A1    Jan. 2, 2025

Related U.S. Application Data

(60) Provisional application No. 63/399,871, filed on Aug. 22, 2022, provisional application No. 63/301,467, filed on Jan. 20, 2022.

(30) Foreign Application Priority Data

Feb. 7, 2022 (EP) .................... 22155345.6

(51) Int. Cl.
*G06F 16/00* (2019.01)
*G06F 16/25* (2019.01)
*G06F 16/41* (2019.01)

(52) U.S. Cl.
CPC ............ *G06F 16/41* (2019.01); *G06F 16/258* (2019.01)

(58) Field of Classification Search
CPC .............................. G06F 16/41; G06F 16/258
See application file for complete search history.

(56) References Cited

U.S. PATENT DOCUMENTS 9,852,219 B2    12/2017 Hannuksela
11,272,213 B2 *  3/2022 Su ................. H04N 19/463
(Continued)

FOREIGN PATENT DOCUMENTS

TW    201931853 A    8/2019
TW    202114414 A    4/2021
(Continued)

OTHER PUBLICATIONS

Hannuksela, M., et al., The High Efficiency Image File Format Standard, Standards in a Nutshell, IEEE Signal Processing Magazine, p. 150-156, Jun. 15, 2015, 7 pages.
(Continued)

*Primary Examiner* — Farhan M Syed

(57) ABSTRACT

Embodiments described herein provide a unified container format for delivering different multimedia applications. One embodiment provides a data structure utilized for implementing a plurality of multimedia applications. The data structure includes a first metadata level including low-level metadata used to perform operations associated with media data in a bitstream. The data structure includes a second metadata level including mid-level metadata used to apply operation metadata to render the media data. The data
(Continued)

structure includes a third metadata level including upper-level metadata used to utilize the low-level metadata and the mid-level metadata to deliver the plurality of multimedia applications. The first metadata level further includes synchronization metadata for converting the media data, the low-level metadata, the mid-level metadata, and the upper-level metadata from a first multimedia application of the plurality of multimedia applications to a second multimedia application of the plurality of multimedia applications.

18 Claims, 7 Drawing Sheets

(56) References Cited

U.S. PATENT DOCUMENTS

| | | | |
|---|---|---|---|
| 2007/0130205 A1* | 6/2007 | Dengler | G06F 9/451 |
| 2011/0252065 A1* | 10/2011 | Ryu | G06F 16/41 |
| | | | 707/E17.143 |
| 2015/0379096 A1* | 12/2015 | Flynn | G06F 16/211 |
| | | | 707/602 |
| 2018/0262819 A1 | 9/2018 | Tsukagoshi | |
| 2018/0278963 A1 | 9/2018 | Schueuer | |
| 2020/0089764 A1* | 3/2020 | Ritter | G06F 16/5854 |
| 2020/0226171 A1* | 7/2020 | Byrne | G06F 16/483 |
| 2020/0272628 A1* | 8/2020 | Dageville | G06F 16/221 |
| 2020/0272638 A1* | 8/2020 | Motivala | G06F 16/278 |
| 2020/0413099 A1* | 12/2020 | Su | H04N 19/132 |
| 2021/0073259 A1* | 3/2021 | Simms | G06Q 30/0251 |
| 2021/0409818 A1 | 12/2021 | Bouazizi | |

FOREIGN PATENT DOCUMENTS

| | | |
|---|---|---|
| TW | 202127882 A | 7/2021 |
| WO | 2019060778 A1 | 3/2019 |
| WO | 2020264409 A1 | 12/2020 |

OTHER PUBLICATIONS

Heikkila, L., High Efficiency Image File Format Implementation, Master of Science Thesis, May 4, 2016, XP055641996, 61 pages.
ISO/IEC 14496-12 Information technology—Coding of audio-visual objects—Part 12: ISO base media file format, 338 pages.
ISO/IEC 23008-12:2015 Information technology—MPEG system technologies—Part 12: Image File Format, 2nd edition, 96 pages.
Text of ISO/IEC IS 18477-3, 69, JPEG Meeting: Jun. 22, 2015-Jun. 26, 2015; Warsaw; (Joint Picture Expert Group or ISO/IEC JTC1/SC29/WG1), No. wg1n69006, Jun. 25, 2015, xp030170077, 42 pages.

* cited by examiner

DATA STRUCTURE FOR MULTIMEDIA APPLICATONS

1. CROSS-REFERENCE TO RELATED APPLICATIONS

This application represents the national stage entry of PCT Application PCT/US22/53418, filed on Dec. 19, 2022, and claims the benefit of priority from the following priority applications: U.S. provisional applications 63/301,467, filed on Jan. 20, 2022 and 63/399,871 filed on Aug. 22, 2022, and EP application Ser. No. 22/155,345.6, filed on Feb. 7, 2022, each of which is incorporated herein by reference in their entireties.

2. FIELD OF THE DISCLOSURE

This application relates generally to data structures for implementing a plurality of multimedia applications and to a controller for implementing the data structures.

3. BACKGROUND

Multimedia experiences, such as imaging and video applications, utilize a container format (e.g., a metafile, a file format) that allows multiple data streams to be embedded into a single file. These container formats include metadata for identifying the data streams and for detailing how to implement functions of the data stream. Containers include the High Efficiency Image File Format (HEIF), which uses video codec to encode images using intra-frame coding, and the Joint Photographic Experts Group (JPEG) format (also referred to as EXIF and JFIF), which utilizes application segment markers (APP markers) to store information. However, there is an increasing need for a container format for multiple multimedia applications in high dynamic range (HDR) image quality.

BRIEF SUMMARY OF THE DISCLOSURE

Embodiments described herein provide a unified container format for delivering different multimedia experiences. Multimedia experiences include, for example, still photo applications, video application, live photo applications, and the like. Additionally, different multimedia experiences may be different versions of the same application (for example, an original photo application and an updated photo application). The unified container format is backward compatible with existing formats. Multiple experiences are encapsulated in one single bitstream. Using the unified container format, a playback system can decide which application to run depending on computation resources, device capability, and/or user preferences. Additionally, minimum interference and dependency are needed between different multimedia applications.

In one exemplary aspect of the present disclosure, there is provided a data structure utilized for implementing a plurality of multimedia applications. The data structure includes a first metadata level including low-level metadata used to perform operations associated with media data in a bitstream. The data structure includes a second metadata level including mid-level metadata used to apply the low-level metadata to render the media data. The data structure includes a third metadata level including upper-level metadata used to utilize the low-level metadata and the mid-level metadata to deliver the plurality of multimedia applications. The first metadata level further includes synchronization metadata for converting the media data, the low-level metadata, the mid-level metadata, and the upper-level metadata from a first multimedia application of the plurality of multimedia applications to a second multimedia application of the plurality of multimedia applications.

In this manner, various aspects of the present disclosure provide for the implementation of multimedia applications, such as photo applications and video applications having a high dynamic range and high resolution or a standard resolution, and effect improvements in at least the technical fields of image projection, signal processing, image display, and the like.

DESCRIPTION OF THE DRAWINGS

These and other more detailed and specific features of various embodiments are more fully disclosed in the following description, reference being had to the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure and does not limit the scope of the disclosure in any way.

Moreover, while the present disclosure focuses mainly on examples in which the various circuits are used in digital projection systems, it will be understood that these are merely examples. Disclosed systems and methods may be implemented in display devices, such as with an OLED display, an LCD display, a quantum dot display, or the like. It will further be understood that the disclosed systems and methods can be used in any device in which there is a need to project light; for example, cinema, consumer, and other commercial projection systems, heads-up displays, virtual reality displays, and the like.

Three-Level Imaging Format

Figure 1:
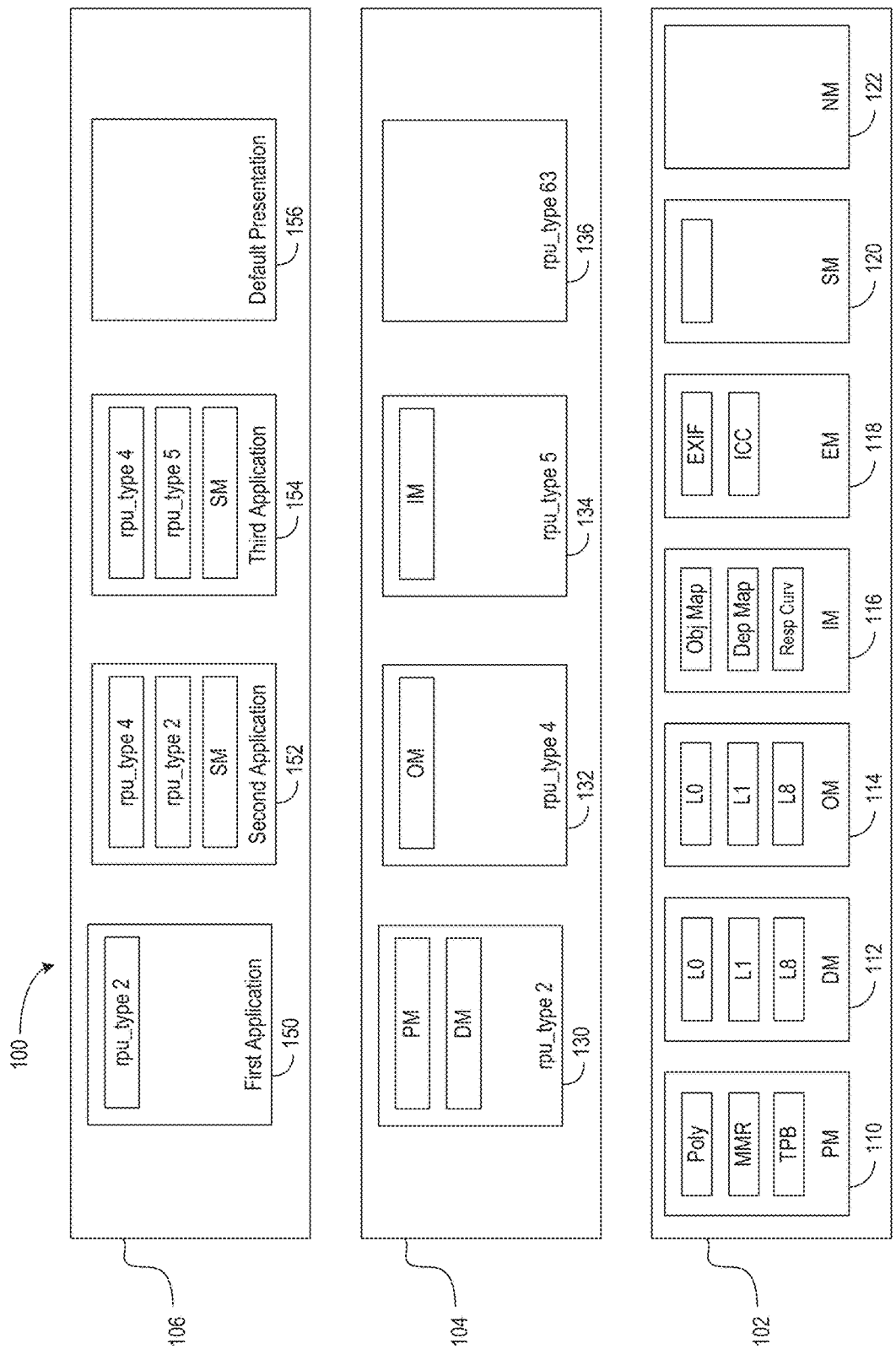
FIG. 1 depicts an example data structure for implementing multimedia experiences.

FIG. 1 provides a three-level data structure 100 (e.g., a metadata architecture, a container, a file structure) for implementing multimedia experiences (e.g., multimedia applications). The data structure 100 includes low-level metadata 102, mid-level metadata 104, and upper-level metadata 106. The low-level metadata 102 and mid-level metadata 104 serve as building blocks implemented by the upper-level metadata 106, which includes the multimedia experiences.

The low-level metadata 102 consists of fundamental metadata to describe how to perform operations on top of standard media data in a bitstream. The low-level metadata 102 includes prediction metadata (PM) 110, display management metadata (DM) 112, photo metadata (OM) 114, immersive metadata (IM) 116, Exchangeable Image File format (EXIF)/International Color Consortium (ICC) metadata (EM) 118, synchronization metadata (SM) 120, and null metadata (NM) 122. In some implementations, the low-level metadata 102 may include additional metadata used for implementing the multimedia experiences.

The prediction metadata 110 includes the polynomial prediction, the Multivariate Multiple Regression (MMR) prediction, and the Tensor-Product B-spline (TPB) prediction. The display management metadata 112 contains different levels of metadata syntax, ranging from L0 to L255. The photo metadata 114 is used for new still images, and may have the same L1 syntax as the display management metadata 112. The EXIF/ICC metadata 118 includes camera image-related metadata, such as thumbnail information. The immersive metadata 116 contains object maps, depth maps, and response curves. The null metadata 122 is reserved and used when baseline media data is needed without any additional metadata. Several metadata groups may contain several same or similar syntaxes. Additionally, at a decoder, a dispatcher component may convert one syntax in one metadata group to another syntax of another metadata group, re-using existing code and hardware and reducing the code size.

The synchronization metadata 120 is structured similarly to the display management metadata 112. Each level of the synchronization metadata 120 specifies the source experience, the sink experience, and designed operations. The following tables provide example syntax. However, other syntax may also be used. In some implementations, the synchronization metadata 120 is updated and edited using various user-accessible tools.

The payload header indicates the number of extension blocks to include in the synchronization metadata 120, an example of which is shown in Table 1.

TABLE 1

Example Payload Header

|  | C | Descriptor |
|---|---|---|
| sm_data_payload( ) { |  |  |
|   num_ext_blocks | 0 | ue(v) |
|   if( num_ext_blocks ) { |  |  |
|     while( !byte_aligned( ) ) |  |  |
|       dm_alignment_zero_bit | 0 | f(1) |
|     for( i = 0; i < num_ext_blocks; i ++ ) { |  |  |
|       ext_metadata_block( ) | 0 |  |
|     } |  |  |
|   } |  |  |
| } |  |  |

Each extension block includes a simple header indicating the length, level, and container to include its own payload, an example of which is shown in Table 2.

TABLE 2

Example Extension Block Headers

|  | C | Descriptor |
|---|---|---|
| ext_metadata_block( ) { |  |  |
|   ext_block_length | 0 | ue(v) |

TABLE 2-continued

Example Extension Block Headers

|  | C | Descriptor |
|---|---|---|
|   ext_block_level | 0 | u(8) |
|   ext_block_payload( ext_block_length, | 0 |  |
|   ext_block_level ) |  |  |
| } |  |  |

An example of the payload format itself is provided below in Table 3.

TABLE 3

Example Payload Format

|  | C | Descriptor |
|---|---|---|
| ext_block_payload( ext_block length, |  |  |
| ext_block_level ) { |  |  |
|   ext_block_len_bits = 8 * ext_block_length |  |  |
|   ext_block_use_bits = 0 |  |  |
|   if( ext_block level == xxx ) { |  |  |
|     ... |  |  |
|   } |  |  |
|   while( ext_block_use_bits++ < |  |  |
|   ext_block_len_bits ) |  |  |
|     ext_dm_alignment_zero_bit | 0 | f(1) |
| } |  |  |
|   if( ext_block_level == xxx ) { |  |  |
|     source_experience_ID | 0 | u(8) |
|     sink_experience_ID | 0 | u(8) |
|     operation_value | 0 | u(32) |
|     ext_block_use_bits += 32 |  |  |
|   } |  |  |

The source_experience_ID and sink_expierence_ID shown in Table 3 may be defined and mapped on the upper level. The operation_value metadata in Table 3 is a place holder for various usages, such as:

Temporal Synchronization: when editing a video in a video application, a corresponding still photo may be updated in a photo application. In such an instance, the operation_value metadata may be the frame index or the time stamp.

Spatial Resolution: different multimedia experiences may have different scales in the same attribute. For example, still photo often has a larger resolution than video. The operation_value metadata can define the resolution mapping between different experiences.

Propagation Option/Strength: The synchronization metadata 120 may indicate whether the editing or translation of data between different multimedia experiences is allowed, and the corresponding "strength" inside or between experiences. For example, the operation_value metadata may be a simple binary flag to indicate whether the workflow from standard dynamic range (SDR) photo to HDR video is allowed. If workflow from SDR photo to HDR video is allowed, the operation_value metadata may define which type of SDR to HDR conversion algorithms and their correspondence parameters should be used. For example, which TPB enum to pick may be specified such that backward reshaping from SDR to HDR with a different color volume may be specified. Additionally, for HDR video to SDR photo, the strength may indicate which TPB enum to select and use to perform forward reshaping to generate the SDR photo.

Metadata conversion: synchronization metadata 120 may indicate how to convert metadata from one multimedia experience to another, such as from a photo application to a video application or vice versa.

Auxiliary information: synchronization metadata 120 may indicate the required metadata to perform operations related to a multimedia experience.

When multiple multimedia experiences are provided in a single bitstream, multiple extension blocks with the same level may be utilized. For example:

Multiple Sinks: Converting from a first experience A to a second experience B may impact a third experience C. In such a scenario, two extension blocks with the same level may indicate the operations. For example, a bitstream contains SDR photo, HDR video, and immersive HDR/SDR photo. Updating the HDR video impacts both the SDR photo and the immersive HDR/SDR photo.

Multiple Sources: A bitstream may contain SDR photo, HDR video, and immersive HDR photo. One application may be converted to another. For example, the SDR photo can be converted from HDR video, and SDR photo can be converted from immersive HDR photo.

The mid-level metadata 104 describes which media data to provide as the input to a processing module, and describes how to apply operation metadata to render the media data. In other words, the mid-level metadata 104 consists of the media data bitstreams and the corresponding required low-level metadata 102 for used rendering. Media data may be packed together with the experience metadata inside the bitstream, or stored in a different location of the same bitstream. In some implementations, storing the media data in a different location may enable format backward compatibility.

Each multimedia experience may contain none, one, two, or more low-level metadata 102 and encapsulate different low-level metadata 102 into an rpu_type format. In some implementations, there are 64 rpu_type available to assign. In the illustrated example, the mid-level metadata 104 contains an rpu_type_2 130, an rpu_type_4 132, an rpu_type_5 134, and an rpu_type_63 136. rpu_type_2 130 contains media data as the base layer bitstream, and contains two lower-level metadata: the prediction metadata 110 and the display management metadata 112. The rpu_type_4 132 contains photo metadata 114. The rpu_type_5 134 contains the immersive metadata 116. rpu_type_63 136 may be reserved for TPB payload.

The upper-level metadata 106 includes several applications that utilize the mid-level metadata 104 and the synchronization metadata 120, such as a first application 150, a second application 152, and a third application 154, each application being a different multimedia experience (such as a photo experience, a video experience, an SDR photo experience, an HDR photo experience, an SDR video experience, an HDR video experience, an immersive SDR/HDR video experience, or the like). Multiple of the same type of experience may exist in the same bitstream. Each experience may also include side information indicating whether the media data and metadata are packed together or located in different locations.

The playback system determines what to play according to playback computation resource, device capability, and end user preference. Playback computation resources indicate which level of experience the system can support. Device capability includes whether the end device (e.g., output device) is capable of displaying HDR images and video, sensors available on the end device, and whether or not the end device has a touch screen. End user preference includes which experience a user has requested to render or prefers to render.

In some embodiments, the upper-level metadata 106 includes a default presentation application 156 (e.g., a raw application). Alternatively, the presentation mode (or application) may be selected by the user. In some embodiments, the bitstream may be encapsulated in an existing container which has the format of the default presentation application 156. For example, a photo experience may include a JPEG thumbnail as the default presentation without associating with any low-level metadata 102 or mid-level metadata 104. However, the upper-level metadata 106 may describe the mechanism between different applications with the default presentation using the synchronization metadata 120. In other embodiments, the bitstream is encapsulated in a container which does not have the default presentation. In such embodiments, the required application is activated by users or environmental input.

Media Playback

Figure 2:
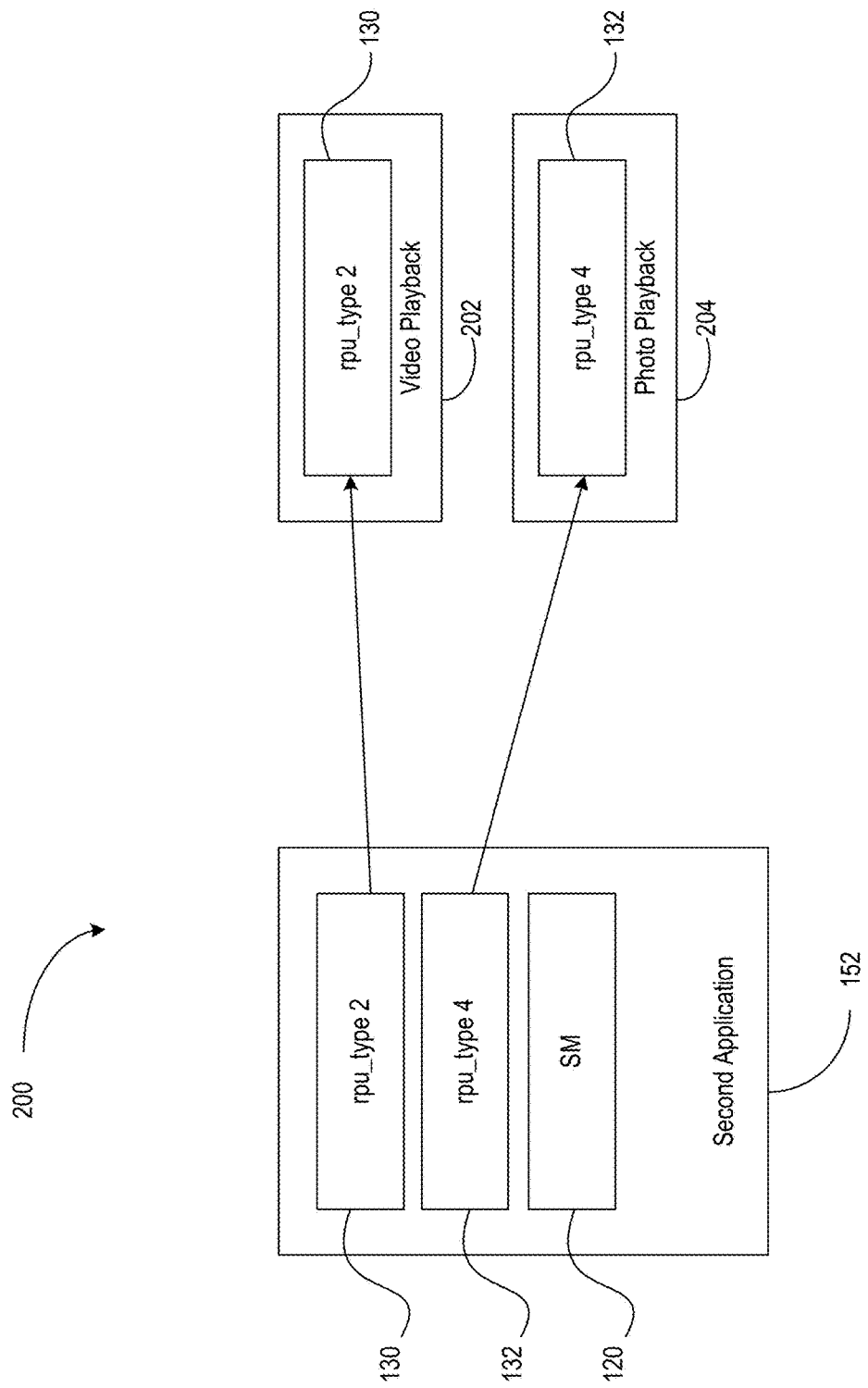
FIG. 2 depicts an example playback operation for multimedia experiences.

Devices implementing the data structure 100 may play different experiences depending on the computation resources, display capability, sensor availability, and user preferences available to the device. For example, FIG. 2 provides a playback operation 200 for a multimedia experience, such as the second application 152. The second application 152 may be, for example, a photo or image experience. When the second application 152 is stored in a legacy container, such as a JPEG container, (e.g., as defined by the JPEG standard, the EXIF and JFIF file formats, and the like), and the legacy container file is passed on to an end device, only the JPEG SDR still image is provided.

However, if the second application 152 is provided to an end device implementing the data structure 100, media data can be viewed in SDR or HDR still image using the photo playback 204 implementing the rpu_type_4 132, or can be viewed as an HDR live photo (e.g., video) using prediction metadata 110 and display management metadata 112 included in the rpu_type_2 130, implemented by the video playback 202. Whether media data is viewed using the video playback 202 or the photo playback 204 is based on user preference or user selection.

Media Editing

Figure 3A:
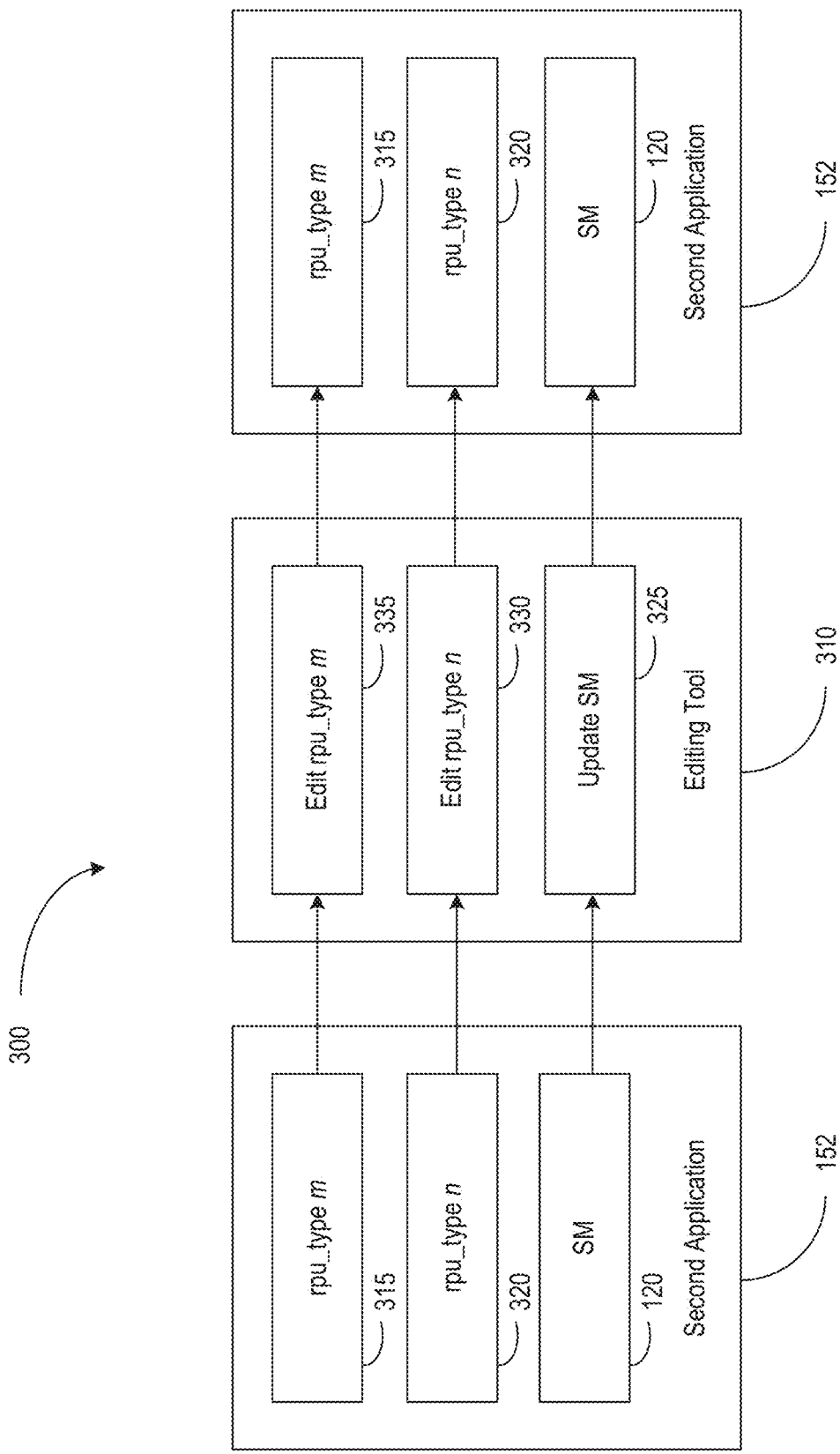
FIG. 3A depicts an example intra-experience editing operation for multimedia experiences.
Figure 3B:
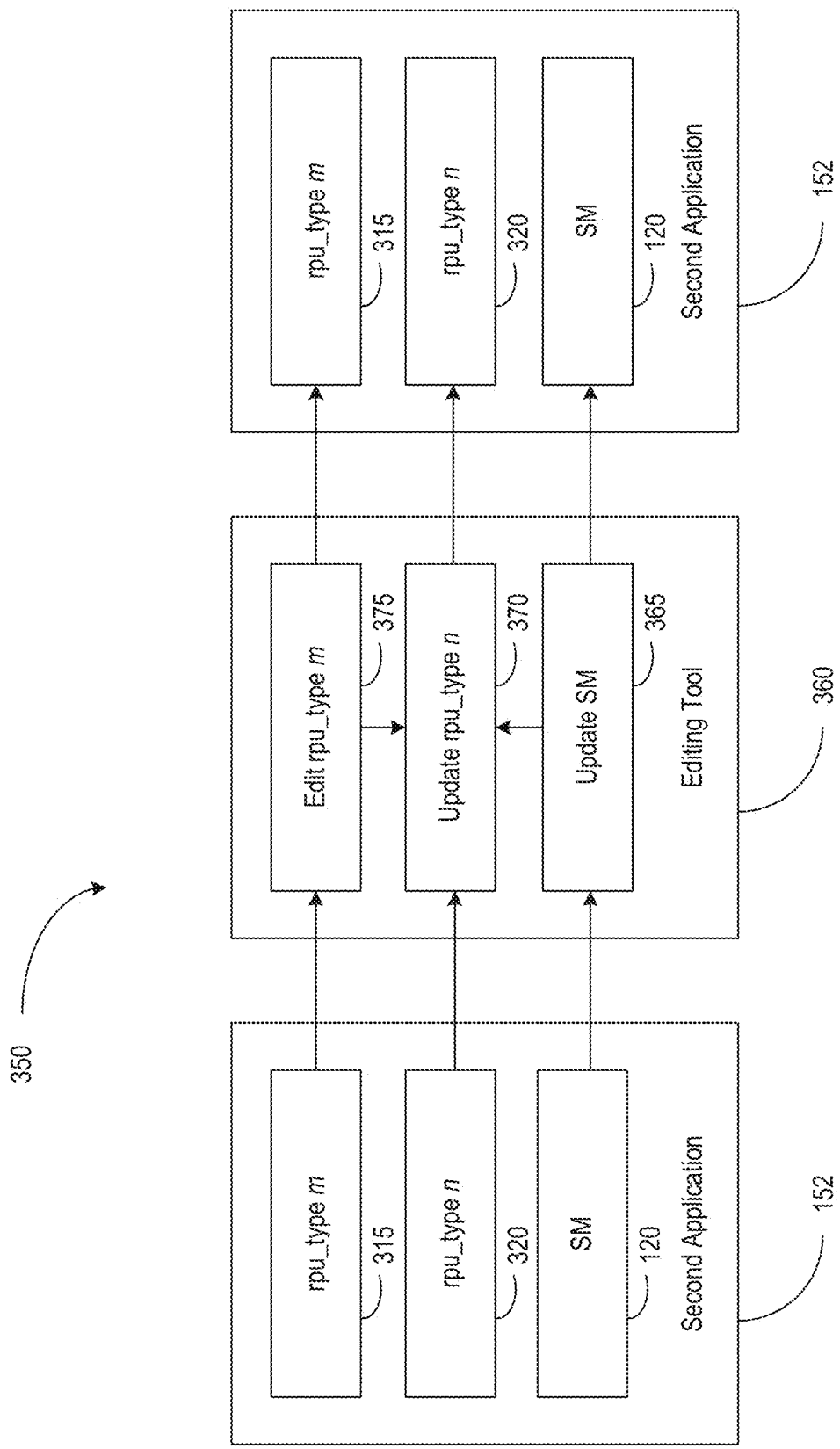
FIG. 3B depicts an example inter-experience editing operation for multimedia experiences.

Media data may be edited to modify the experience (for example, its color grading, its resolution, its frame rate, or the like) defined by its rpu_type. FIG. 3A illustrates an example intra-experience editing operation 300, which allows each experience (e.g., each rpu_type) to perform editing without affecting another experience (e.g., another rpu_type). FIG. 3B illustrates an example inter-experience editing operation 350, in which editing in one experience is propagated to other experiences. Whether to perform the intra-experience editing operation 300 or the inter-experience editing operation 350, and how to propagate between experiences, is defined by the synchronization metadata 120.

The intra-experience editing operation 300 of FIG. 3A allows editing in one experience (e.g., the second application 152) using an editing tool 310. While editing results may be propagated to other experiences, media data and its corresponding metadata are edited in a single experience. The intra-experience editing operation 300 of FIG. 3A may perform several different operations based on whether editing in one experience is automatically reflected to other experiences. The operations may include individual editing in one experience without updating another experience, editing one experience and automatically updating another experience with the edits, and editing one experience and optionally updating other experiences with the edits. The editing update is controlled by the synchronization metadata 120.

In the example of FIG. 3A, the second application 152 includes an rpu_type_m 315, and rpu_type_n 320, and the synchronization metadata 120. An edit rpu_type_m module 335 performs any editing of the rpu_type_m 315. An edit rpu_type_n module 330 performs any editing of the rpu_type_n 320. An update synchronization metadata module 325 updates the synchronization metadata 120.

As an example of the intra-experience editing operation 300, synchronization metadata 120 controls the propagation of editing between an SDR still image and an HDR still image. In some embodiments, the SDR still image is edited independently of the HDR still image without updating the HDR still image. In some embodiments, editing the HDR still image automatically updates the SDR still image. In some embodiments, the SDR still image is edited, and the HDR still image is updated conditionally using backward revertible TPB to upconvert SDR to HDR. Object-based (e.g., masking) side information may be used when the edit to the SDR still image contains new content, such as graphics and texts. The added information may be upconverted differently and then fused in the HDR domain.

The inter-experience editing operation 350 allows for editing several experiences jointly using an editing tool 360. For example, in some embodiments, one experience is edited with reference from other experiences, and the editing result automatically updates the other experiences. In other embodiments, one experience is edited with reference from other experiences, and the editing result optionally updates the other experiences. The editing update is controlled by the synchronization metadata 120.

In the example of FIG. 3B, the second application 152 includes an rpu_type_m 315, and rpu_type_n 320, and the synchronization metadata 120. An edit rpu_type_m module 375 performs any editing of the rpu_type_m 315. An update synchronization metadata module 365 updates the synchronization metadata 120. The changes are then propagated to an update rpu_type_n module 370, which updates the rpu_type_n 320.

As an example of the inter-experience editing operation 350, synchronization metadata 120 controls the propagation of editing between an SDR still image and HDR live photo (e.g., video). In some embodiments, the HDR live photo is edited and the SDR still image is automatically updated. In such an embodiment, metadata indicates which frame in the HDR video to make the edit. In other embodiments, the SDR still image is edited and the HDR live photo is conditionally updated using backward revertible TPB. In such an embodiment, inverse metadata indicates how to propagate the editing results, such as cropping, resizing, and tone mapping.

Experience Translation

Figure 4A:
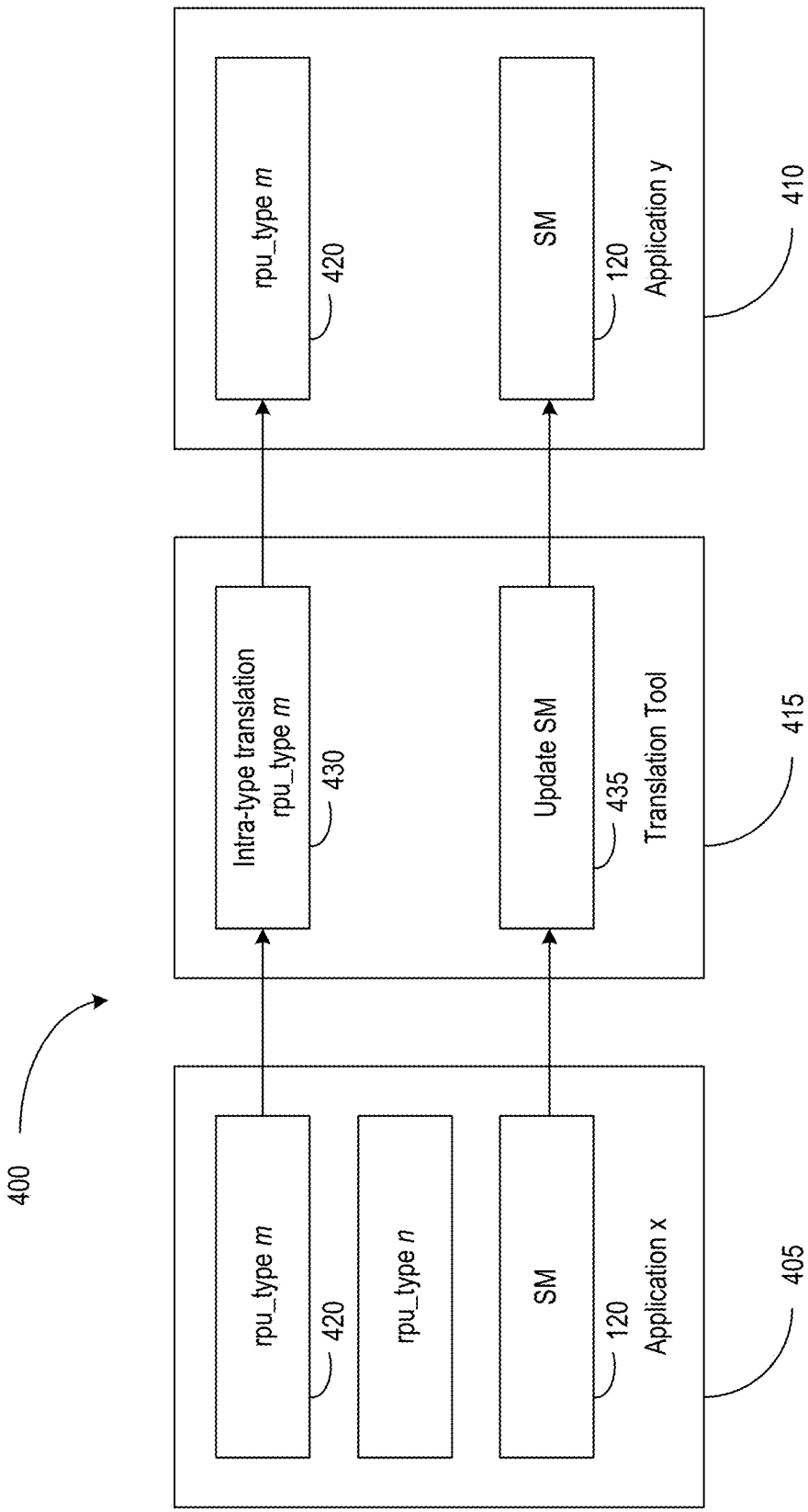
FIG. 4A depicts an example intra-experience translation operation for multimedia experiences.
Figure 4B:
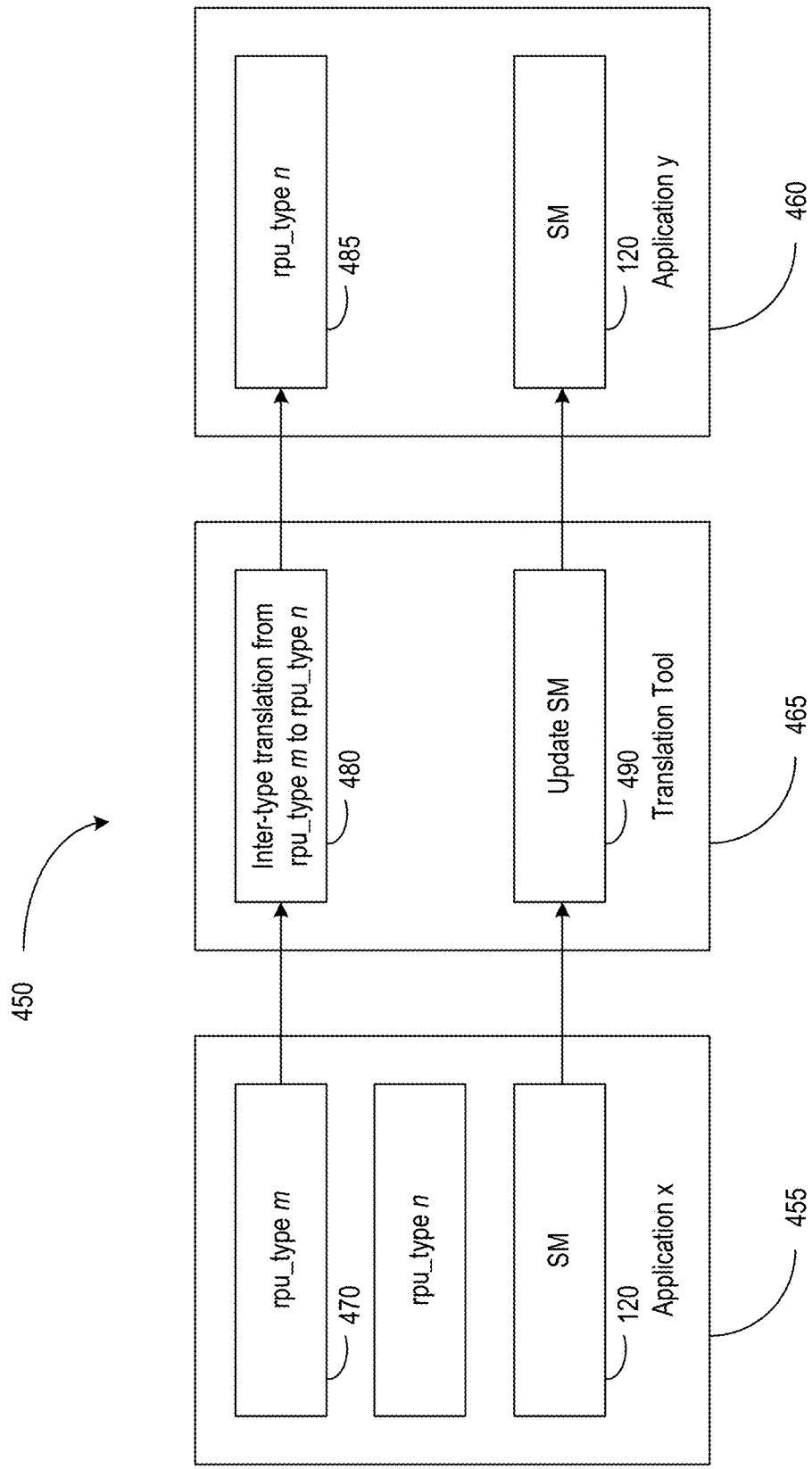
FIG. 4B depicts an example inter-experience translation operation for multimedia experiences.

Experience translation converts one experience into another experience, and involves content transforming between profile and level even within the same experience. FIG. 4A illustrates an example intra-experience translation operation 400. FIG. 4B illustrates an example inter-experience translation operation 450.

FIG. 4A includes an application x 405, an application y 410, and a translation tool 415. The translation tool 415 translates from the application x 405 to the application y 410. Both the application x 405 and the application y 410 may be different profiles (or versions) of the same or a similar experience, such as converting from one photo experience to another photo experience. The intra-experience translation operation 400 may include media data translation in which the media data, such as a High Efficiency Video Coding (HEVC) coded bitstream, is decoded to a common workspace and encoded to another workspace for conversion. Different settings, such as resolution, color space, frame rate, SEI, and VUI may be converted. This function is performed by the intra-type translation rpu_type_m module 430, which converts an rpu_type_m 420 from the application x 405 to the application y 410. The intra-experience translation operation 400 may also include metadata translation in which an update synchronization metadata tool 435 updates metadata, such as the synchronization metadata 120, according to the conversion. For example, the display management metadata 112 may be converted to new content.

FIG. 4B includes an application x 455, an application y 460, and a translation tool 465. The translation tool 465 translates from the application x 455 to the application y 460. The application x 455 may be, for example a video experience, and the application y 460 may be, for example, a photo experience. The inter-experience translation operation 450 may include media data translation in which media data is converted from one type of media to another type of video. For example, media data may be converted from photo to video, or vice versa. The media data translation may be performed by inter-type translation from rpu_type_m to rpu_type_n module 480, which translations rpu_type_m 470 to rpu_type_n 485. The inter-experience translation operation 450 may also include metadata translation, where one type of metadata is converted to another type of metadata. For example, photo metadata 114 may be converted to video metadata (included in display management metadata 112) or vice versa. In some embodiments, the prediction metadata 110 is converted. The update synchronization metadata block 490 may update the synchronization metadata 120.

Container Implementation

The data structure 100 may be integrated into existing containers, such as HEIF or JPEG. HEIF, as one example, uses video codec to encode an image using intra-frame coding. The syntax of HEIF is based on ISO BMFF (Base Media File Format). ISO BMFF uses "boxes" to structure different categories of data. Each box is led by a four character type (4CC). Boxes may be nested or be hierarchical (e.g., a box inside another box). Each box has a size, which is an integer that specifies the number of bytes in the box. Additionally, each box has a box type, such as compact.

Two different definitions are used to separate still images and video. First, still images are stored as items. All image items are independently coded and do not depend on any other item in their decoding. Any number of image items may be included in the same file. Image sequences (e.g., video) are stored as tracks. An image sequence track is used when there is coding dependency between images or when the playback of images is timed. As opposed to video tracks, the timing in the image sequence track is advisory.

HEIF bitstreams contain two major components: metadata with 4CC as "meta", and media data with 4CC as media data box "mdat" or item data box "idat". The metadata part represents the side information (e.g., the structure of the multimedia application), and the media data stores the multimedia data.

Components of the data structure 100 may be implemented in HEIF bitstreams as boxes. For example, the low-level metadata 102 may be defined as box "dbom":

--- aligned (8) class ImagingOperationMetadata
    extends FullBox ('dbom', version, flags)
{

```
        unsigned int (32) metadata_type;
        bit (8) data[ ];
    }
```

The above metadata_type may be, for example, "prdm" for the prediction metadata 110, "dipm" for the display management metadata 112, "phom" for the photo metadata 114, and "synm" for the synchronization metadata 120. Additional components of the low-level metadata 102 may also be defined.

The mid-level metadata 104 may be defined as box "dbex," which includes the low-level metadata 102:

```
aligned (8) class ImagingExperienceMetadata
    extends FullBox ('dbex', version, flags)
{
    unsigned int (32) experience_type;
    unsigned int (32) operation_metadata_count;
    unsigned int (32) media_data_count;   // consistency checking
    for (i = 0; i < operation_metadata_count; i++) {
        ImagingOperationMetadata operation[ ];
    }
    if (experience type == 2 ) {    // Video Experience
    }
    else if (experience_type == 4 ) {    // Photo Experience
    }
    else if (experience_type == 5 ) {    // Immersive Experience
    }
    else {
        // not supported
    }
}
```

The association of media data to each experience metadata and operation metadata may be linked by an ItemProperties Box ("iprp") included in the HEIF bitstream. For the upper-level metadata 106, an "iref" box defines the required metadata and media data for each application. In some implementations, the box for the synchronization metadata 120 is stored at the top level.

JPEG-XT, as another example, is backward compatible with JPEG. JPEG-XT utilizes an APP marker (APP11) to store additional information for extension. Sixteen APP markers are present in JPEG. To utilize the data structure 100, the format may be extended, without limitation, to APP11. Since the JPEG marker (16 bits 0xff followed by a 16 bit ID) has 16-bit info to indicate the number of bytes in the current marker, each marker only carries 216=64 Kbyte of info. If the metadata is larger than 64 KB, multiple APP markers are needed.

Additionally, to avoid false detection of marker byte "0xff", for a non-marker byte 0xff, a byte stuffing 0x00 should be followed for every 0xff. With box definitions and box structures used in ISO BMFF, the headers and media data may be put into multiple APP markers in JPEG. Thus, while a raw experience is provided as a JPEG still image, other devices are capable of providing similar experiences.

Enabling Still Images in HDR

The described boxes may be further expanded on to provide an HDR experience for still images. Table 4 provides example Codec options for an imaging experience.

TABLE 4

Image Experience Codec Examples

| ID | Codec choices |
|---|---|
| 1 | PQ HDR in HEIF<br>PQ, R2020, 10 Knits<br>YCbCr/IPT<br>HEVC 10 b |
| 2 | HLG HDR in HEIF<br>HLG, R2020, 1 Knits<br>YCbCr<br>HEVC 10 b |
| 3 | JPG + HDR (single inventory in JPEG)<br>Gamma, R709, 100 nits; YCbCr; JPG 8 bit<br>PQ/HLG, R2020, 10 knits; YCbCr/IPT; HEVC 10 b |
| 4 | SDR + HDR (both HEVC as single inventory in HEIF)<br>Gamma, R709, 100 nits; YCbCr; HEVC 10 b<br>PQ,/HLG R2020, 10 knits; YCbCr/IPT; HEVC 10 b |

As one example, with a photo application, an HDR HEVC coded still image may be stored with photo metadata 114. Alternatively, hybrid log-gamma (HLG) transfer functions may be used instead of perceptual quantizer (PQ) transfer functions in the HEVC coded still image, as shown in the below pseudocode:

```
FileTypeBox 'ftyp': major-brand='heic', compatible-
brands='heic, mp41'
MetaBox: (container)
    HandlerBox 'hdlr': 'pict'
    PrimaryItemBox 'pitm': item_ID=1;
    ItemInfoBox 'iinf': entry_count=2
        1) 'infe': item type='hvc1', item_ID=1;
        2) 'infe': item type='Exif', item_ID=2;
    ItemLocationBox'iloc': item_count=2
        item_ID=1, extent_count=1, extent_offset=X,
extent_length=Y;
        item_ID=2, extent_count=1, extent_offset=P,
extent_length=Q;
    ItemReferenceBox 'iref' :
        referenceType ='cdsc', from_item_ID=2, ref_count=1,
to_item_ID=1;
    ItemPropertiesBox 'iprp':
        ItemPropertyContainerBox 'ipco':
        'hvcC'
        'ispe'
        ItemPropertyAssociation 'ipma', entry_count=1:
            item_ID=1, association_count=2,
                essential=1, property_index=1;
                essential=0, property_index=2;
MediaDataBox 'mdat':
    HEVC for HDR Image (at file offset X, with length Y)
    Exif data block (at file offset P, with length Q)
```

In another example, for a photo application, an SDR JPEG coded still image may be stored with EXIF metadata and an HDR HEVC coded still image may be stored with photo metadata, as shown in the below pseudocode:

```
FileTypeBox 'ftyp': major-brand='heic', compatible-
brands='heic'
MetaBox 'meta': (container)
    HandlerBox 'hdlr': 'pict'
    PrimaryItemBox 'pitm': item_ID=1;
    ItemInfoBox 'iinf': entry_count=3
        1) 'infe': item_ID=1, item_type='jpeg';
        2) 'infe': item_ID=2, item_type='Exif';
        3) 'infe': item_ID=3, item_type='hvc1';
        4) 'infe': item_ID=3, item_type='dbex';
    ItemLocationBox 'iloc': item_count=4
        item_ID=1, extent_count=1, extent_offset=X1,
extent_length=Y1;
```

-continued

```
        item_ID=2, extent_count=1, extent_offset=X2,
    extent length=Y2;
        item_ID=3, extent_count=1, extent_offset=X3,
    extent length=Y3;
        item_ID=4, extent_count=1, extent_offset=X4,
    extent length=Y4;
    ItemReferenceBox 'iref' :
        referenceType='cdsc', from_item_ID=2, ref_count=1,
to_item_ID=1;
        referenceType='cdsc', from_item_ID=4, ref_count=1,
to_item_ID=3;
    ItemPropertiesBox 'iprp':
        ItemPropertyContainerBox 'ipco' :
        'hvcC'
        'ispe'
    ItemPropertyAssociation 'ipma': entry_count=2
        1) item_ID=1, association_count=2
            essential=1, property_index=1;
            essential=0, property_index=2;
        2) item_ID=1, association_count=2
            essential=1, property_index=3;
            essential=0, property_index=4;
MediaDataBox 'mdat' or 'idat' :
    JPEG SDR Image (at file offset X1, with length Y1)
    Exif data block (at file offset X2, with length Y2)
    HEVC HDR Image (at file offset X3, with length Y3)
    dbex data block (at file offset X4, with length Y4)
```

Figure 5:
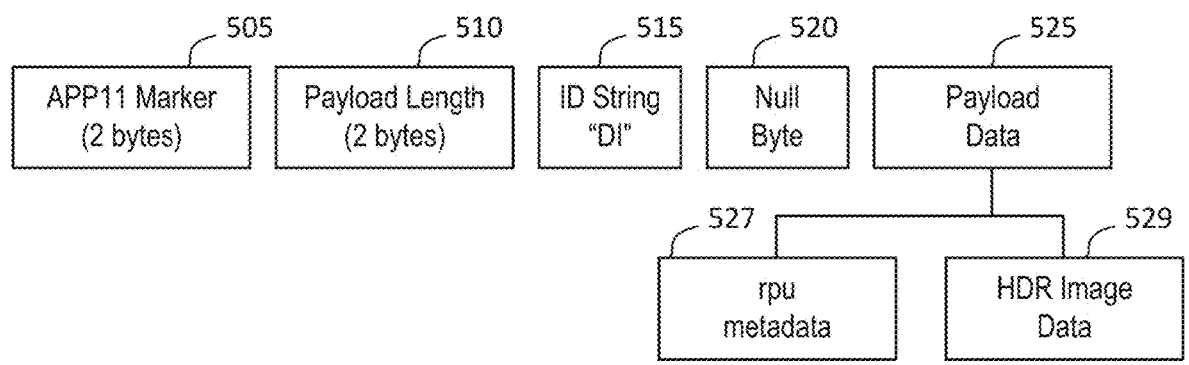
FIG. 5 depicts an example Base Media File Format according to an embodiment of this invention.

FIG. 5 depicts an example of a Base Media File Format (BMFF) according to an embodiment. This BMFF is for a hypothetical new HDR photo format to be called, without limitation, "Dolby Imaging" or "DI." It is based on the JPEG file format using the APP11 marker, although any other APP marker could be used as well. As depicted in FIG. 5, the BMFF includes:

An APP marker (505) (e.g., APP11) (2 bytes).
Length of payload (510) (2 bytes).
An identification string (515) (e.g., "DI")
A null byte (520).
Dolby Imaging payload data (525), which include the HDR (e.g., HEVC) image data (529), and rpu metadata (527).

The above systems and methods may provide data structures for multimedia experiences. Systems, methods, and devices in accordance with the present disclosure may take any one or more of the following configurations.

(1) A data structure utilized for implementing a plurality of multimedia applications, the data structure comprising: a first metadata level including low-level metadata used to perform operations associated with media data in a bitstream; a second metadata level including mid-level metadata used to apply the low-level metadata to render the media data; and a third metadata level including upper-level metadata used to utilize the low-level metadata and the mid-level metadata to deliver the plurality of multimedia applications, wherein the first metadata level further includes synchronization metadata for converting the media data, the low-level metadata, the mid-level metadata, and the upper-level metadata from a first multimedia application of the plurality of multimedia applications to a second multimedia application of the plurality of multimedia applications.

(2) The data structure according to (1), wherein the low-level metadata includes: prediction metadata containing a polynomial prediction, a Multivariate Multiple Regression prediction, and a Tensor-Product B-spline prediction, display management metadata for display of video using the media data, photo metadata for display of an image using the media data, exchangeable image file format metadata containing camera image-related metadata, null metadata for implementing baseline media data and immersive metadata containing an object map, a depth map, and response curves for the media data.

(3) The data structure according to any one of (1) to (2), wherein the synchronization metadata includes a payload header indicating a number of extension blocks, each extension block including a header indicating a length, level, and container for its respective payload.

(4) The data structure according to (3), wherein the payload header includes source_expierience_ID metadata, sink_experience_ID metadata, and operation_value metadata.

(5) The data structure according to (4), wherein the operation_value metadata is one selected from the group consisting of a frame index of a still photo, a time stamp of a video frame, a resolution mapping function, and a binary flag indicating whether workflow from a standard dynamic range (SDR) photo to a high dynamic range (HDR) video is permitted.

(6) The data structure according to any one of (1) to (5), wherein the plurality of multimedia applications includes a still photo application and a video application.

(7) The data structure according to (6), wherein, when the media data is manipulated in the still photo application, the synchronization metadata updates the media data, the low-level metadata, the mid-level metadata, and the upper-level metadata for the video application.

(8) The data structure according to any one of (1) to (7), wherein the low-level metadata and the mid-level metadata are implemented as boxes within a High Efficiency Image Format (HEIF) container.

(9) The data structure according to (8), wherein the boxes are implemented into application segment markers (APP markers) in a Joint Photographic Experts Group (JPEG) container.

(10) A controller for implementing the data structure according to any one of (1) to (9), wherein the controller is configured to: edit a video in a first application included in the plurality of multimedia applications; and propagate the edit to a corresponding photo in a second application included in the plurality of multimedia applications, wherein the synchronization metadata includes a frame index for the corresponding photo.

(11) The data structure according to any one of (1) to (9), wherein the synchronization metadata defines a resolution mapping between the first multimedia application and the second multimedia application.

(12) The data structure according to any one of (1) to (9) or (11), wherein the synchronization metadata includes a binary flag indicating whether workflow from a standard dynamic range (SDR) photo application to a high dynamic range (HDR) video application is permitted.

(13) The data structure according to (12), wherein the synchronization metadata includes SDR to HDR conversion algorithms and their corresponding parameters.

(14) A controller for implementing the data structure according to any one of (1) to (9) or (11) to (13), wherein the controller is configured to: receive a user input indicating one of the plurality of multimedia application; and provide the media data as either an SDR still photo application or an HDR video application based on the user input.

(15) A controller for implementing the data structure according to any one of (1) to (9) or (11) to (13), wherein the controller is configured to perform an intra-multimedia-application editing operation in which editing the media data in a first multimedia application is performed without affecting a second multimedia application.

(16) A controller for implementing the data structure according to any one of (1) to (9) or (11) to (13), wherein the controller is configured to perform an inter-multimedia-application editing operation in which editing the media data in a first multimedia application is propagated to a second multimedia application.

(17) A controller for implementing the data structure according to any one of (1) to (9) or (11) to (13), wherein the controller is configured to perform an intra-multimedia-application translation operation in which the media data is translated from a first multimedia application of a first type to a second multimedia application of the first type.

(18) A controller for implementing the data structure according to any one of (1) to (9) or (11) to (13), wherein the controller is configured to perform an inter-multimedia-application translation operation in which the media data is translated from a first multimedia application of a first type to a second multimedia application of a second type.

(19) A controller for implementing the data structure according to any one of (1) to (9) or (11) to (13), wherein the controller is configured to: provide the media data as either an SDR still photo application or an HDR video application according to at least one of playback computation resources, device capability, and end user preference.

(20) A controller for implementing the data structure according to any one of (1) to (9) or (11) to (13), wherein, to provide an imaging application included in the plurality of multimedia applications, the controller is configured to include at least one of: (a) a first codec including a perceptual-quantizer transfer function for HDR in an HEIF container; (b) a second codec including a hybrid log-gamma transfer function for HDR in the HEIF container; (c) a third codec including JPG and HDR as a single inventory in a JPEG container; and (d) a fourth codec including SDR and HDR, both as HEVC and as a single inventory in the HEIF container.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

The invention claimed is:

1. A controller for implementing a data structure utilized for implementing a plurality of multimedia applications, the data structure comprising:
   a first metadata level including low-level metadata used to perform operations associated with media data in a bitstream;
   a second metadata level including mid-level metadata used to apply the low-level metadata to render the media data; and
   a third metadata level including upper-level metadata used to utilize the low-level metadata and the mid-level metadata to deliver the plurality of multimedia applications,
   wherein the first metadata level further includes synchronization metadata for converting the media data, the low-level metadata, the mid-level metadata, and the upper-level metadata from a first multimedia application of the plurality of multimedia applications to a second multimedia application of the plurality of multimedia applications,
   wherein the controller is configured to:
   perform an inter-multimedia-application editing operation in which editing the media data in a first multimedia application is propagated to a second multimedia application,
   wherein, to perform the inter-multimedia-application editing operation, the controller is configured to:
   edit a video in a first application included in the plurality of multimedia applications; and
   transmit the synchronization metadata to a device configured to propagate the edit to a corresponding photo in a second application included in the plurality of multimedia applications implemented on the device,
   wherein the synchronization metadata includes a frame index for the corresponding photo.

2. The controller according to claim 1, wherein the low-level metadata includes:
   prediction metadata containing a polynomial prediction, a Multivariate Multiple Regression prediction, and a Tensor-Product B-spline prediction,
   display management metadata for display of video using the media data,
   photo metadata for display of an image using the media data, exchangeable image file format metadata containing camera image-related metadata,
null metadata for implementing baseline media data, and
immersive metadata containing an object map, a depth map, and response curves for the media data.

3. The controller according to claim 1, wherein the synchronization metadata includes a payload header indicating a number of extension blocks, each extension block including a header indicating a length, level, and container for its respective payload.

4. The controller according to claim 3, wherein the payload header includes source_expierience_ID metadata, sink_experience_ID metadata, and operation_value metadata.

5. The controller according to claim 4, wherein the operation_value metadata is one selected from the group consisting of a frame index of a photo still, a time stamp of a video frame, a resolution mapping function, and a binary flag indicating whether workflow from a standard dynamic range (SDR) photo to a high dynamic range (HDR) video is permitted.

6. The controller according to claim 1, wherein the plurality of multimedia applications includes a still photo application and a video application.

7. The controller according to claim 6, wherein, when the media data is manipulated in the still photo application, the synchronization metadata updates the media data, the low-level metadata, the mid-level metadata, and the upper-level metadata for the video application.

8. The controller according to claim 1, wherein the low-level metadata and the mid-level metadata are implemented as boxes within a High Efficiency Image Format (HEIF) container.

9. The controller according to claim 8, wherein the boxes are implemented into application segment markers (APP markers) in a Joint Photographic Experts Group (JPEG) container.

10. The controller according to claim 1, wherein the synchronization metadata defines a resolution mapping between the first multimedia application and the second multimedia application.

11. The controller according to claim 1, wherein the synchronization metadata includes a binary flag indicating whether workflow from a standard dynamic range (SDR) photo application to a high dynamic range (HDR) video application is permitted.

12. The controller according to claim 11, wherein the synchronization metadata includes SDR to HDR conversion algorithms and their corresponding parameters.

13. The controller of claim 1, wherein the controller is configured to:
receive a user input indicating one of the plurality of multimedia applications; and
provide the media data as either an SDR still photo application or an HDR video application based on the user input.

14. The controller of claim 1, wherein the controller is configured to perform an intra-multimedia-application editing operation in which editing the media data in a first multimedia application is performed without affecting a second multimedia application.

15. The controller according to claim 1, wherein the controller is configured to perform an intra-multimedia-application translation operation in which the media data is translated from a first multimedia application of a first type to a second multimedia application of the first type.

16. The controller according to claim 1, wherein the controller is configured to perform an inter-multimedia-application translation operation in which the media data is translated from a first multimedia application of a first type to a second multimedia application of a second type.

17. The controller according to claim 1, wherein the controller is configured to:
provide the media data as either an SDR still photo application or an HDR video application according to at least one of playback computation resources, device capability, and end user preference.

18. The controller according to claim 1, wherein, to provide an imaging application included in the plurality of multimedia applications, the controller is configured to include at least one of:
(a) a first codec including a perceptual-quantizer transfer function for HDR in an HEIF container;
(b) a second codec including a hybrid log-gamma transfer function for HDR in the HEIF container;
(c) a third codec including JPG and HDR as a single inventory in a JPEG container; and
(d) a fourth codec including SDR and HDR, both as HEVC and as a single inventory in the HEIF container.

* * * * *